United States Patent
Ohshima (10) Patent No.: US 6,724,808 B1
(45) Date of Patent: Apr. 20, 2004

(54) TRANSMISSION POWER CONTROL METHOD OF MEASURING EB/N0 AFTER WEIGHTED SIGNALS ARE COMBINED

(75) Inventor: Manabu Ohshima, Kanagawa (JP)

(73) Assignee: NEC Corporation, Tokyo (JP)

( * ) Notice: Subject to any disclaimer, the term of this patent is extended or adjusted under 35 U.S.C. 154(b) by 564 days.

(21) Appl. No.: 09/607,145

(22) Filed: Jun. 29, 2000

(30) Foreign Application Priority Data

Jul. 2, 1999 (JP) .......................................... 11/189238

(51) Int. Cl.[7] .............................................. H04B 1/707
(52) U.S. Cl. ....................................... 375/147; 375/148
(58) Field of Search ................................. 375/142–144, 375/148, 150, 295; 370/342, 335, 441

(56) References Cited

U.S. PATENT DOCUMENTS

| 5,812,542 | A | | 9/1998 | Bruckert et al. | |
|---|---|---|---|---|---|
| 5,881,057 | A | | 3/1999 | Komatsu | |
| 6,067,315 | A | * | 5/2000 | Sandin | 370/252 |
| 6,125,109 | A | * | 9/2000 | Fuerter | 370/315 |
| 6,370,183 | B1 | * | 4/2002 | Newson et al. | 375/144 |
| 6,385,181 | B1 | * | 5/2002 | Tsutsui et al. | 370/335 |
| 6,456,849 | B1 | * | 9/2002 | Purnadi et al. | 455/453 |
| 6,470,044 | B1 | * | 10/2002 | Kowalski | 375/148 |
| 6,507,605 | B1 | * | 1/2003 | Fukumoto et al. | 375/152 |

FOREIGN PATENT DOCUMENTS

| JP | 8-265217 | 10/1996 |
|---|---|---|
| JP | 9-18400 | 1/1997 |
| JP | 9-312609 | 12/1997 |
| JP | 10-98431 | 4/1998 |
| JP | 10-190526 | 7/1998 |
| JP | 10-256969 | 9/1998 |
| JP | 2853705 | 11/1998 |
| JP | 10-322268 | 12/1998 |
| WO | WO 99/17466 | 4/1999 |

OTHER PUBLICATIONS

S. Ariyavisitakul and L. F. Chang, "Performance of Unequalized Frequency–Hopped TDMA on Dispersive Fading Channels", IEEE, Bellcore, Radio Research Department, 1993.*

Alouini, M.–S.; Scaglione, A.; Giannakis, G.B.; "Principal Components Combining For Dense Correlated Multipath Fading Environments", IEEE vol. 5, Sep. 24–28, 2000., pp. 2510–2517.*

* cited by examiner

Primary Examiner—Tesfaldet Bocure
Assistant Examiner—Qutub Ghulamali
(74) Attorney, Agent, or Firm—Scully, Scott, Murphy & Presser (57) ABSTRACT

A transmission power control method of measuring an Eb/N0 after weighted signals are combined is disclosed. A plurality of rake receivers detect respective received signals for respective paths, delay demodulated data which are the detection result based on a set delay time, and then combine and output the demodulated data. A multipath searcher acquires reception delay information which is information on a delay time among the respective paths contained in the received signals. A rake receiver control unit sets the delay times for the rake receivers based on the reception delay information acquired by the multipath searcher. A plurality of first weighting units weight the demodulated data output from the respective rake receivers. A first combining unit combines the signals weighted by the first weighting units into one signal. An Eb/N0 measuring unit measures an Eb/N0 of the demodulated data combined by the first combining unit.

19 Claims, 7 Drawing Sheets

TRANSMISSION POWER CONTROL METHOD OF MEASURING EB/N0 AFTER WEIGHTED SIGNALS ARE COMBINED

BACKGROUND OF THE INVENTION

1. Field of the Invention

The present invention relates to a digital car telephone and cellular phone system (cellular system) using a CDMA (Code Division Multiple Access) communication scheme, and more particularly to a CDMA communication device and a transmission power control method.

2. Description of the Related Art

In recent years, the CDMA communication scheme attracts attention as a communication method for use in mobile communication systems due to its resistance to interference and disturbance. The CDMA communication scheme refers to a communication scheme in which a transmitting side spreads a user signal to be transmitted with a spreading code and then transmits the signal, while a receiving side performs despread with the same code as that used by the transmitting side to obtain the original user signal.

In the CDMA communication scheme, a plurality of transmitting sides perform spread with different spreading codes each having orthogonality, and a receiving side selects a spreading code for use in despread to allow each communication to be specified, thereby making it possible for a plurality of communications to use the same frequency band.

However, since it is difficult to completely maintain the orthogonality among all the spreading codes being used, exact orthogonality is not obtained actually in the respective spreading codes, resulting in a correlational component between one code and another code. The correlational component serves as an interference component for the communication associated with the one code and contributes to deterioration of communication quality. Since the interference component is produced from such a factor, the interference component is increased as the number of the communications is increased.

For this reason, there is a critical risk in that, when signal power from one mobile station is significantly higher than signal power from another mobile station at an antenna of a base station, the base station can not demodulate the signals other than the signal from the mobile station which produces the high received power, of a plurality of signals received at its antenna. The problem is widely known as a near-far problem in the CDMA communication scheme. In the CDMA cellular system, to solve the near-far problem, a TPC (Transmission Power Control) technique is essential in which the signal power from all transmitters at an input of a receiver is controlled to have the same magnitude.

In the transmission power control, a receiver has a preset Eb/N0 (desired wave power density to noise power density ratio) serving as a reference and the receiver controls transmission power from each transmitter such that an Eb/N0 obtained from a communication of each transmitter is equal to the Eb/N0 reference value. More specifically, a downward channel for transmission from a base station to a mobile station includes a transmission power control signal for directing an increase or decrease in transmission power of the mobile station, which data is used by the base station to direct an increase or decrease in current transmission power to each mobile station. On the other hand, an upward channel for transmission from the mobile station to the base station includes a transmission power control signal for directing an increase or decrease in transmission power to the base station, which data is used by the mobile station to direct an increase or decrease in current transmission power to the base station.

In the CDMA cellular system, a rake/diversity reception technique is also essential to high-quality reception under a multipath fading environment.

Figure 1:
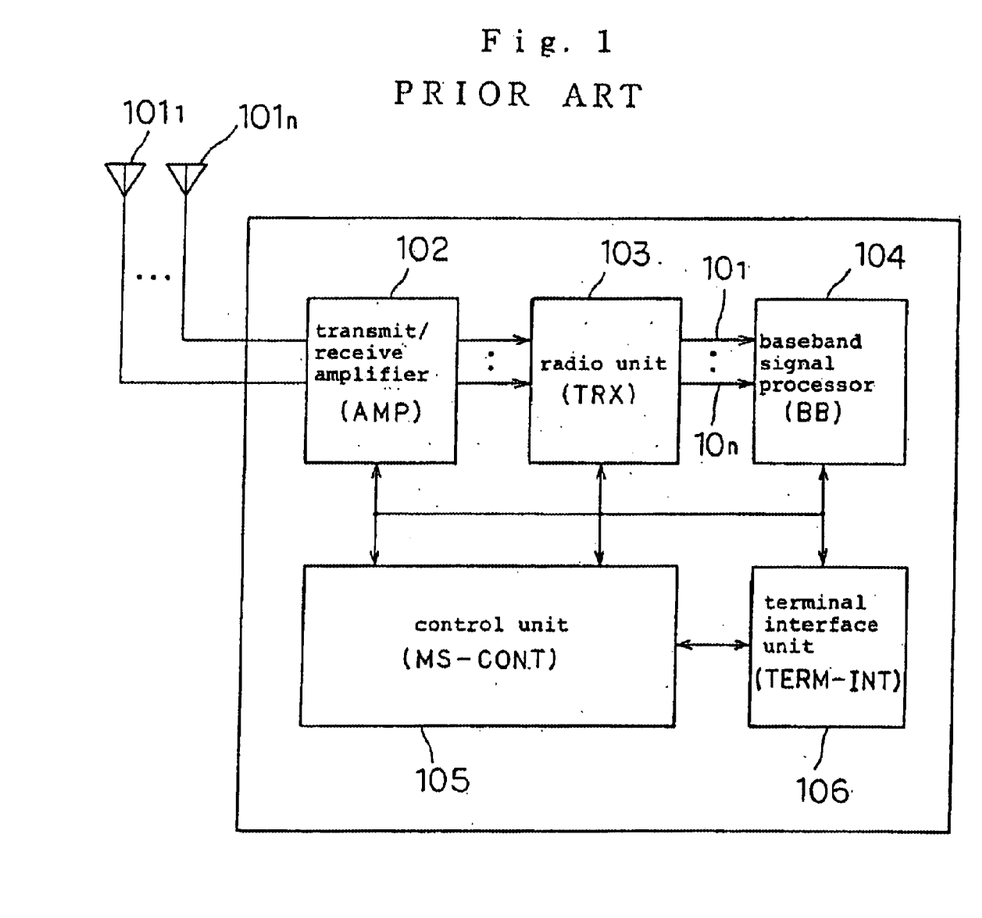
FIG. 1 is a block diagram showing a configuration of a mobile station in a cellular system using the CDMA scheme.

FIG. 1 is a block diagram showing a configuration of a mobile station in such a cellular system.

The mobile station comprises n antennas $101_1$ to $101_n$, transmit/receive amplifier (AMP) 102, radio unit (TRX) 103, baseband signal processor (BB) 104, control unit (MS-CONT) 105, and terminal interface unit (TERM-INT) 106.

Antennas $101_1$ to $101_n$ transmit an upward RF signal amplified at a transmission amplifier in transmit/receive amplifier 102, and receive a downward RF signal from a base station and output the signal to transmit/receiver amplifier 102. Diversity reception is achieved by using n antennas $101_1$ to $101_n$. Transmit/receive amplifier 102 is provided with a transmission amplifier for amplifying a transmission RF signal and a low noise amplifier for amplifying a reception RF signal, and demultiplexes the RF transmission signal and the RF reception signal for connection to antennas $101_1$ to $101_n$. Radio unit 103 converts a transmission signal which has been subjected to baseband spread from digital form to analog form and performs quadrature modulation for conversion to an RF signal, and performs quasi-synchronous detection and converts a signals received from transmit/receive amplifier 102 from analog form to digital form for transmission to baseband signal processing unit 104.

Baseband signal processing unit 104 performs baseband signal processing such as error correction coding for transmission data, framing, data modulation, spread modulation, despread of a received signal, chip synchronization, error correction decoding, data demultiplexing, diversity handover combination function, reception level measuring function, and the like.

Control unit 105 performs control of the entire mobile station. Terminal interface unit 106 has a function as an adapter for voice and various types of data, as well as a function as an interface to a handset and image/data terminals.

Figure 2:
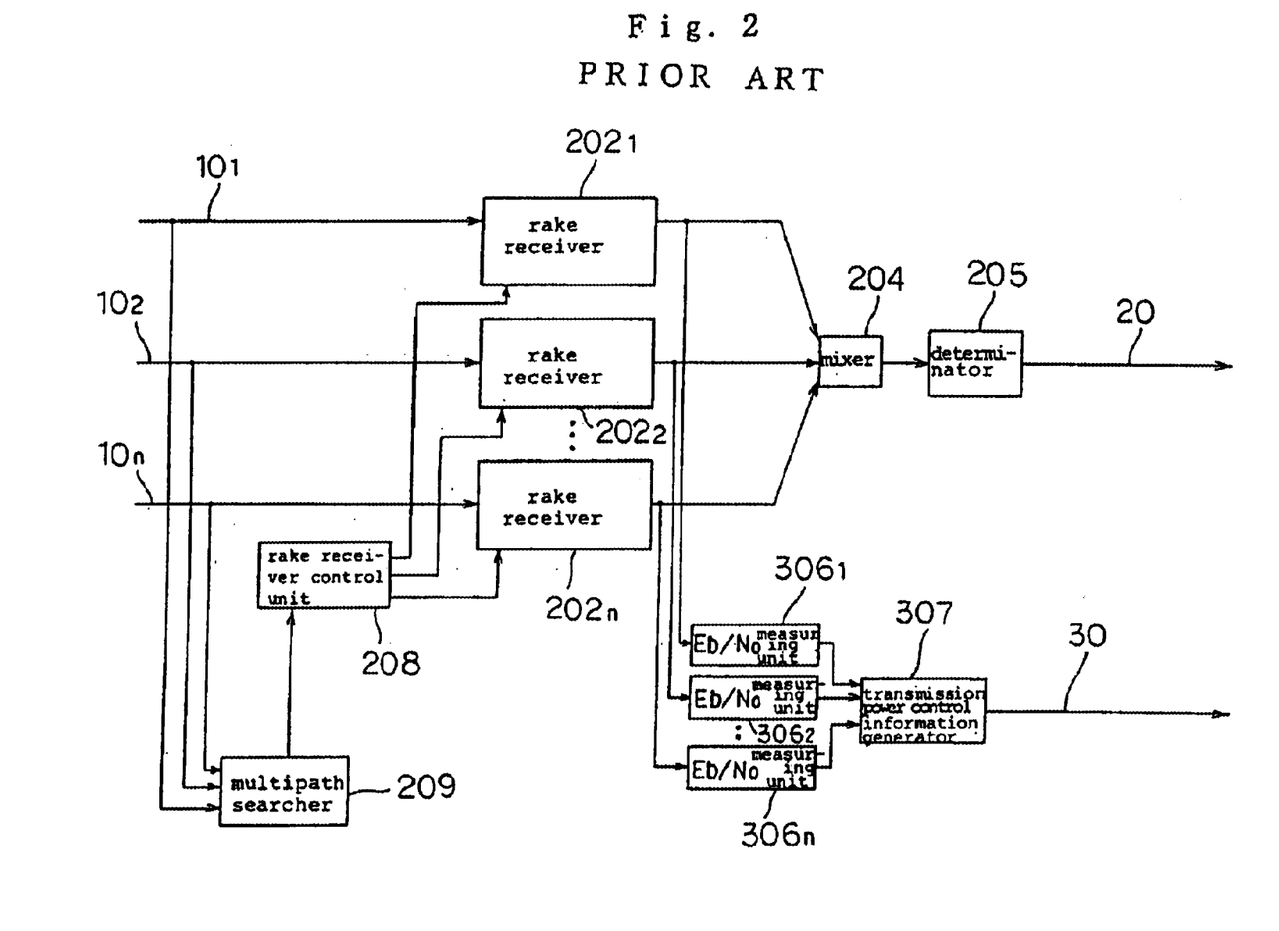
FIG. 2 is a block diagram showing a configuration of a conventional CDMA communication device.

Next, FIG. 2 shows a configuration of a conventional CDMA communication device provided in baseband signal processing unit 104.

The conventional CDMA communication device comprises n rake receivers $202_1$ to $202_n$, mixer 204, determinator 205, n Eb/N0 measuring units $306_1$ to $306_n$, transmission power control information generator 307, rake receiver control unit 208, and multipath searcher 209.

Figure 3:
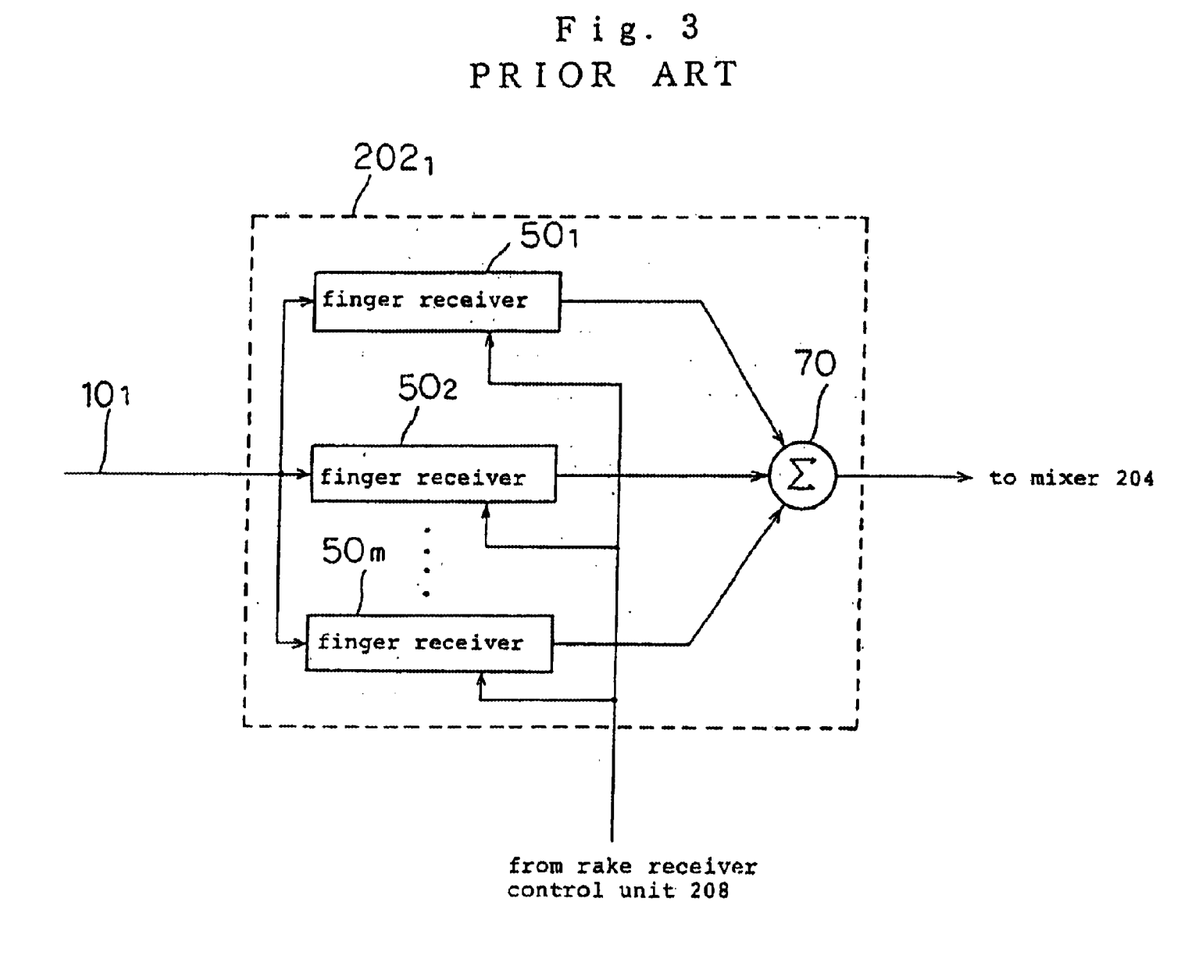
FIG. 3 is a block diagram showing the configuration of rake receiver $202_1$ in FIG. 2.

As shown in FIG. 3, rake receiver $202_1$ includes m finger receivers $50_1$ to $50_m$ and mixer 70. Since the configurations of rake receivers $202_2$ to $202_n$ are similar to that of rake receiver $202_1$, the description thereof is omitted.

Multipath searcher 209 acquires, from received signals $10_1$ to $10_n$, reception delay information which is information on delay times among respective paths contained in received signals $10_1$ to $10_n$. Rake receiver control unit 208 sets delay times for finger receivers $50_1$ to $50_m$ in each of rake receivers $202_1$ to $202_n$ based on the reception delay information acquired at multipath searcher 209.

Rake receivers $202_1$ to $202_n$ detects received signals $101_1$ to $101_n$, and output demodulated data which is the result of the detection. Specifically, finger receivers $50_1$ to $50_m$ generate the demodulated data by individually demodulating received signal $10_1$ for respective paths, delay the demodulated data using the delay time set by rake receiver control unit 208, and then output the data to mixer 70. Mixer 70 combines the demodulated data from finger receivers $50_1$ to $50_m$ and outputs the combined data.

Mixer 204 combines the demodulated data from rake receivers $202_1$ to $202_n$ into one signal. Determinator 205 performs decoding with a determination of the signal combined by mixer 204 for output as decoded signal 20.

Eb/N0 measuring units $306_1$ to $306_n$ measure the Eb-N0s of the signals from rake receivers $202_1$ to $202_n$. Transmission power control information generator 307 sums the Eb/N0 measured at Eb/N0 measuring units $306_1$ to $306_n$ to obtain the measurement result of the Eb/N0s, and generates transmission power control information 30 based on the measuring result of the Eb/N0s. Transmission power control information 30 is transmitted to the base station which is a transmitter through an upward channel, thereby performing transmission power control.

Next, the operation of the conventional CDMA communication device is described. In the conventional CDMA communication device, received signals $10_1$ to $10_n$ input thereto are sent to multipath searcher 209 which acquires reception delay information which is information on delay times among respective paths contained in received signals $10_1$ to $10_n$. Rake receiver control unit 208 sets delay times for finger receivers $50_1$ to $50_m$ in each of rake receivers $202_1$ to $202_n$ based on the reception delay information acquired at multipath searcher 209. Received signals $10_1$ to $10_n$ demodulated and delayed by finger receivers $50_1$ to $50_m$ are combined by mixer 70 as demodulated data after detection.

Mixer 204 combines the demodulated data obtained at rake receivers $202_1$ to $202_n$ into one signal. The demodulated data combined at mixer 204 is subjected to a determination at determinator 205, resulting in decoded signal 20.

The demodulated data obtained at rake receivers $202_1$ to $202_n$ are input to Eb/N0 measuring units $306_1$ to $306_n$ for measuring the Eb/N0s of the respective demodulated data. Transmission power control information generator 307 derives the measuring result of the Eb/N0s by summing up the respective measured Eb/N0s, and generates transmission power control information 30 based on the obtained measuring result of the Eb/N0s.

In the mobile station in the conventional CDMA cellular system, the measuring result of the Eb/N0s is obtained by measuring the Eb/N0s for respective rake receivers $202_1$ to $202_n$ and summing up the measured Eb/N0s. However, under an environment with fading, interference of another signal, reception of highly correlated signals associated with a reception delay, or the like, the accuracy of the Eb/N0 measurement is deteriorated to cause the inability to perform stable transmission power control.

Additionally, in the conventional CDMA cellular system, the n demodulated data obtained from rake receivers $202_1$ to $202_n$ are combined as they are. For this reason, in some reception states, the Eb/N0 of the demodulated data after the combination obtained by mixer 204 may not be higher than the Eb/N0 of the demodulated data before the combination.

SUMMARY OF THE INVENTION

It is an object of the present invention to provide a CDMA communication device and a transmission power control method thereof capable of performing stable transmission power control even in a deteriorated reception state.

According to a first aspect of the present invention, the CDMA communication device comprises means for weighting outputs from a plurality of rake receivers, respectively, and means for measuring the Eb/N0 after weighted signals are combined.

In the present invention, since demodulated data from the respective rake receivers are combined after the weighting, the Eb/N0 of the demodulated data after combination is not deteriorated as compared with the Eb/N0 of the demodulated data before the combination. In addition, since the Eb/N0 is measured using the demodulated data after the combination, the Eb/N0 can be measured with higher accuracy even under a deteriorated reception environment.

In an embodiment of the present invention, the CDMA communication device further comprises means for weighting based on RSSI of an output from each rake receiver.

In another embodiment of the present invention, the CDMA communication device further comprises means for controlling transmission power based on the measured Eb/N0.

According to a second aspect of the present invention, the CDMA communication device comprises means for weighting outputs from a plurality of rake receivers, and combines the weighted signals and controls transmission power based on the combined signal.

Since the present invention performs transmission power control with the Eb/N0 derived using the demodulated data after the combination, more accurate transmission power control is possible to allow stable communication.

According to a third aspect of the present invention, the CDMA communication device comprises a plurality of rake receivers, a plurality of first weighting units, a first combining unit, and an Eb/N0 measuring unit.

Each of the plurality of rake receivers demodulates a received signal for each path and combines the respective demodulated data after the respective data are delayed based on a delay time. The plurality of first weighting units weight the demodulated data after the combination output from the respective rake receivers. The first combining unit combines the signals weighted by the first weighting units. The Eb/N0 measuring unit measures an Eb/N0 of the demodulated data combined by the first combining unit.

According to a fourth aspect of the present invention, the CDMA communication device for decoding a plurality of received signals received at different antennas comprises a plurality of rake receivers, a multipath searcher, a rake receiver control unit, a plurality of first weighting units, a first combining unit, and an Eb/N0 measuring unit.

Each of the receivers detects each of the received signals for each path, delays demodulated data which are the detection result based on a set delay time, and then combines and outputs the demodulated data. The multipath searcher acquires reception delay information which is information on delay times among respective paths contained in the received signals. The rake receiver control unit sets the delay time for the respective rake receivers based on the reception delay information acquired by the multipath searcher. The plurality of first weighting units weight the demodulated data output from the respective rake receivers. The first combining unit combines the signals weighted by the first weighting units into one signal. The Eb/N0 measuring unit measures an Eb/N0 of the demodulated data combined by the first combining unit.

Since the present invention performs the Eb/N0 measurement with the demodulated data after the combination by the first combining unit, more accurate Eb/N0 measurement is possible even under a deteriorated reception environment.

In addition, the present invention utilizes the first weighting units to weight the demodulated data from the respective rake receivers before the combination by the first combining unit. Thus, the Eb/N0 of the demodulated data after the combination is not deteriorated as compared with the Eb/N0 of the demodulated data before the combination.

Furthermore, in the present invention, the Eb/N0 measurement with the demodulated data combined by the first combining unit requires only one Eb/N0 measuring unit, thereby allowing a simplified configuration of the CDMA communication device.

According to an embodiment of the present invention, each of the receivers includes a plurality of finger receivers, a plurality of second weighting units, and a second combining unit.

The plurality of finger receivers generate demodulated data by individually demodulating a received signal for each path and then output the demodulated data after the demodulated data are delayed with delay time information contained in the received signal. The plurality of second weighting units weight the demodulated data output from the finger receivers, respectively. The second combining unit combines the demodulated data from the second weighting units and outputs the combined data.

According to the present invention, the second weighting units are provided between the respective finger receivers and the second combining unit, and weighting can also be performed individually for the demodulated data output from the respective finger receivers, thereby enabling estimation for each transmission path.

According to another embodiment of the present invention, the CDMA communication device further comprises means for controlling transmission power based on the Eb/N0 measured by the Eb/N0 measuring unit.

Since the present invention controls transmission power with the Eb/N0 derived with the demodulated data after the combination, more accurate transmission power control is possible to allow stable communication.

According to a fifth aspect of the present invention, the CDMA communication device comprises a transmission power control information generator for generating transmission power control information which is information for controlling transmission power based on the Eb/N0 measured by the Eb/N0 measuring unit.

The present invention generates the transmission power control information with the Eb/N0 derived using the demodulated data after the combination, thereby making it possible to perform more accurate transmission power control and stable communication.

The above and other object, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 4:
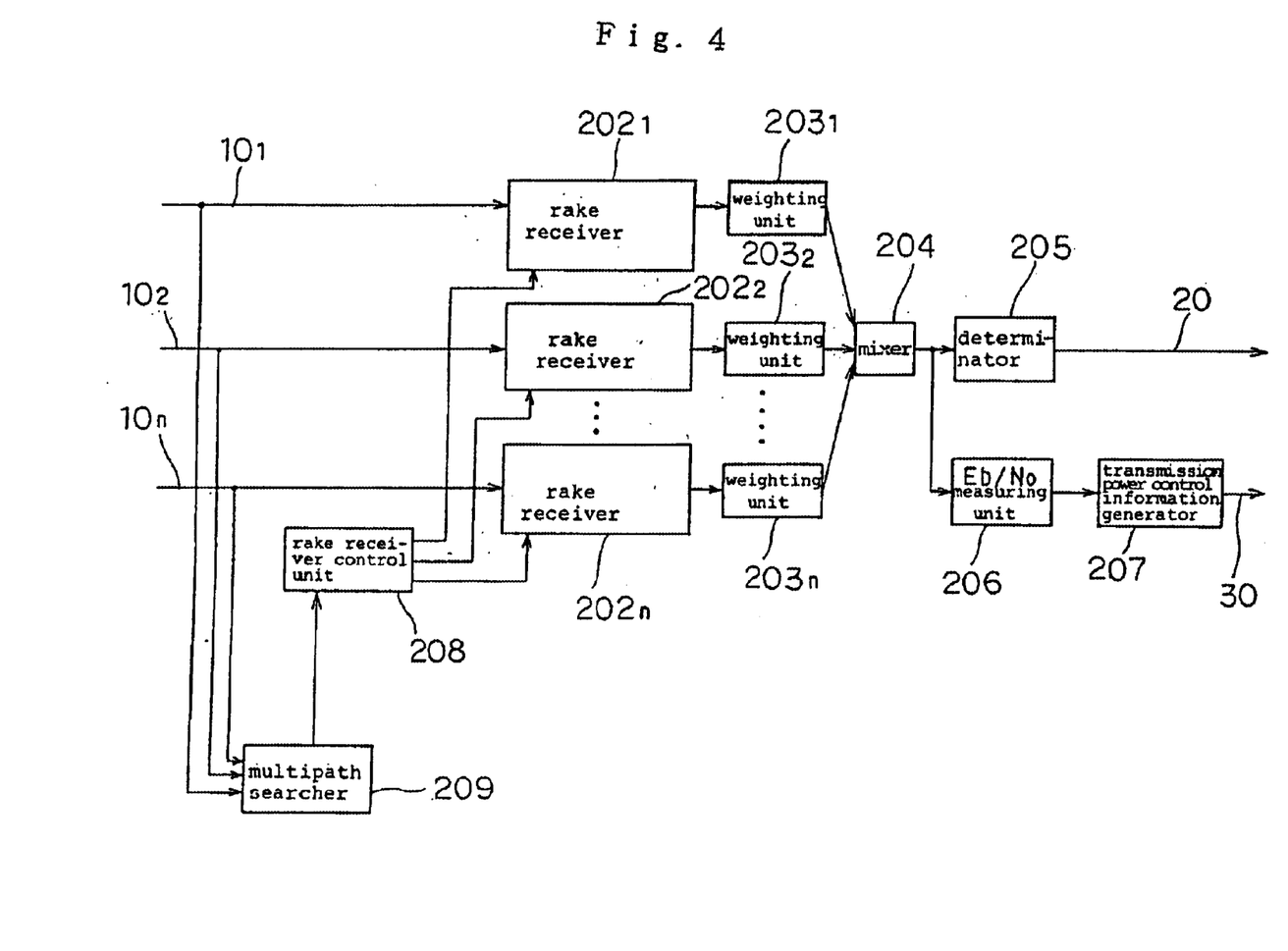
FIG. 4 is a block diagram showing a configuration of a CDMA communication device of a first embodiment of the present invention.

Referring to FIG. 4, a CDMA communication device of a first embodiment of the present invention is provided in baseband signal processing unit 104 of the CDMA cellular system shown in FIG. 1. The CDMA communication device comprises Eb/N0 measuring unit 206 and transmission power control information generator 207 instead of Eb/N0 measuring units $306_1$ to $306_n$ and transmission power control information generator 307 in the conventional CDMA communication device shown in FIG. 2, and further comprises weighting units $203_1$ to $203_n$ between rake receivers $202_1$ to $202_n$ and mixer 204, respectively.

Weighting units $203_1$ to $203_n$ weight demodulated data output from rake receivers $202_1$ to $202_n$, respectively.

A method of weighting is an optimal ratio combination method. The optimal ratio combination method determines weights for weighting units $203_1$ to $203_n$ such that the demodulated data from respective rake receivers $202_1$ to $202_n$ are combined at a ratio which leads to the maximum Eb/N0 of a signal after combination at mixer 204.

Figure 5:
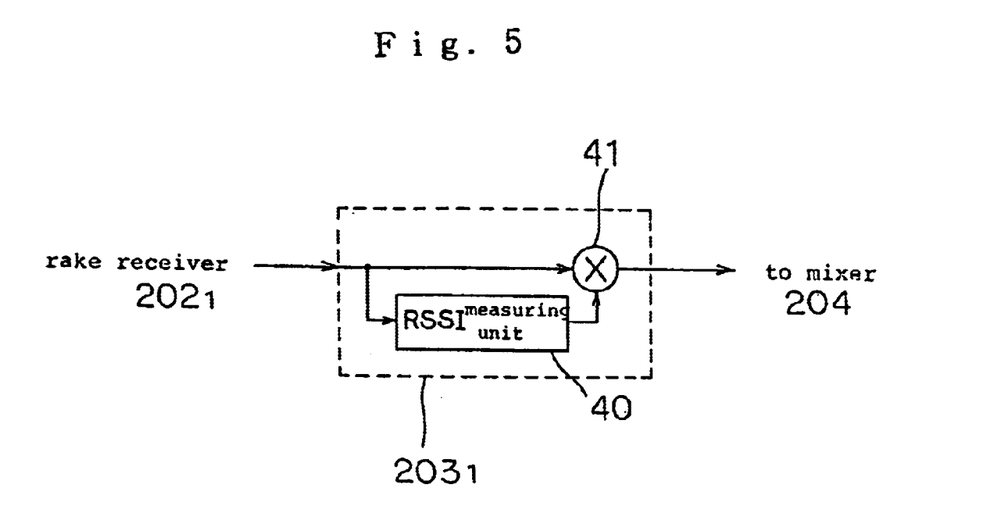
FIG. 5 is a block diagram showing the configuration of weighting unit $203_1$ in FIG. 4.

Another weighting method is a method in which a weight is increased when an RSSI (Received Signal Strength Indicator) of demodulated data is high. FIG. 5 shows the configuration of weighting unit 203, when such weighting is performed.

Weighting unit $203_1$ comprises RSSI measuring unit 40 and multiplier 41 as shown in FIG. 5. Since the configurations of weighting units $203_2$ to $203_n$ are similar to that of weighting unit $203_1$, the description thereof is omitted.

RSSI measuring unit 40 measures the RSSI of the demodulated data from rake receiver $202_1$. Multiplier 41 multiplies the RSSI measured by RSSI measuring unit 40 by the demodulated data from rake receiver $202_1$.

The RSSI is typically measured using a known symbol known to a receiver side. For example, a pilot symbol whose pattern can be known before reception at the receiver side is used. In a W-CDMA (Wide band CDMA) which is one of standards for the CDMA communication system, four pilot symbols are included per slot. The RSSI can be obtained by deriving power per symbol from the total value of the power of the four symbols.

Weighting units $203_1$ to $203_n$ perform weighting such that a weight is increased when the RSSI of demodulated data from rake receivers $202_1$ to $202_n$ is high, with the aforementioned operation.

Eb/N0 measuring unit 206 measures the Eb/N0 of demodulated data after combination at mixer 204. Transmission power control information generator 207 generates transmission power control information 30 based on the measurement result of the Eb/N0 measured at Eb/N0 measuring unit 206.

Next, the operation of the CDMA communication device in the embodiment is detailed in detail with reference to FIG. 4.

In the CDMA communication device in the embodiment, the operation to the generation of the demodulated data at respective rake receivers $202_1$ to $202_n$ is similar to that of the conventional CDMA communication device shown in FIG. 2. The description thereof is thus omitted.

The demodulated data from respective rake receivers $202_1$ to $202_n$ are combined into one demodulated data by mixer 204 after the weighting at weighting units $203_1$ to $203_n$. Eb/N0 measuring unit 206 measures the Eb/N0 using the demodulated data after the combination. Transmission power control information generator 207 generates transmission power control information 30 using the result and sends the information.

The demodulated data after the combination by mixer 204 exerts an Eb/N0 higher than those of the n demodulated data before the combination. Since the combination is performed after the weighting by weighting units $203_1$ to $203_n$, it is very unlikely that the Eb/N0 of the demodulated data after the combination is lower than the Eb/N0 of the demodulated data before the combination even in a deteriorated reception state such as fading.

The configuration as in the embodiment in which the Eb/N0 is measured using the demodulated data after the combination enables Eb/N0 measurement with higher accuracy even under a deteriorated reception environment as mentioned above. Transmission power control information 30 is generated with the Eb/N0 derived using the demodulated data after the combination to allow more accurate transmission power control, resulting in stable communication.

In the conventional CDMA communication device shown in FIG. 2, Eb/N0 measuring units $306_1$ to $306_n$ are required for respective rake receivers $202_1$ to $202_n$. However, according to the CDMA communication device of the embodiment, only one Eb/N0 measuring unit 206 is required due to the Eb/N0 measurement of the demodulated data after the combination, thereby permitting a simplified configuration for a mobile station.

In the embodiment, the Eb/N0 can not be measured and the transmission power control information can not be obtained until after the rake/diversity combination. However, particular problems are not produced if a control delay is minimized by performing the rake/diversity combination, the Eb/N0 measurement, and the generation of the transmission power control information with the measured Eb/N0 in a period shorter than a transmission power control period.

Second Embodiment

Figure 6:
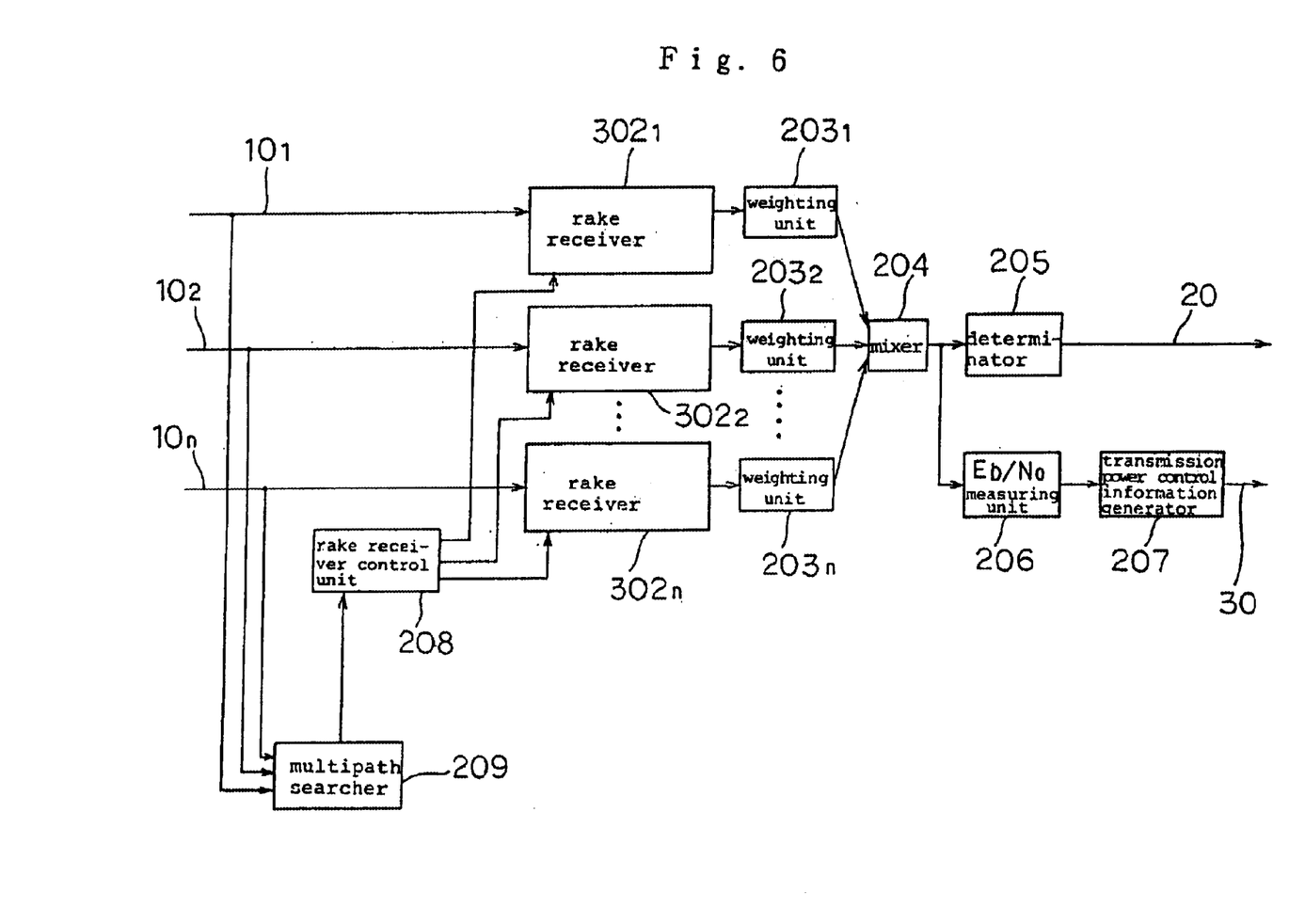
FIG. 6 is a block diagram showing a configuration of a CDMA communication device of a second embodiment of the present invention.

Referring to FIG. 6, a CDMA communication device of a second embodiment of the present invention comprises rake receivers $302_1$ to $302_n$ instead of rake receivers $202_1$ to $202_n$ in the CDMA communication device shown in FIG. 4.

Figure 7:
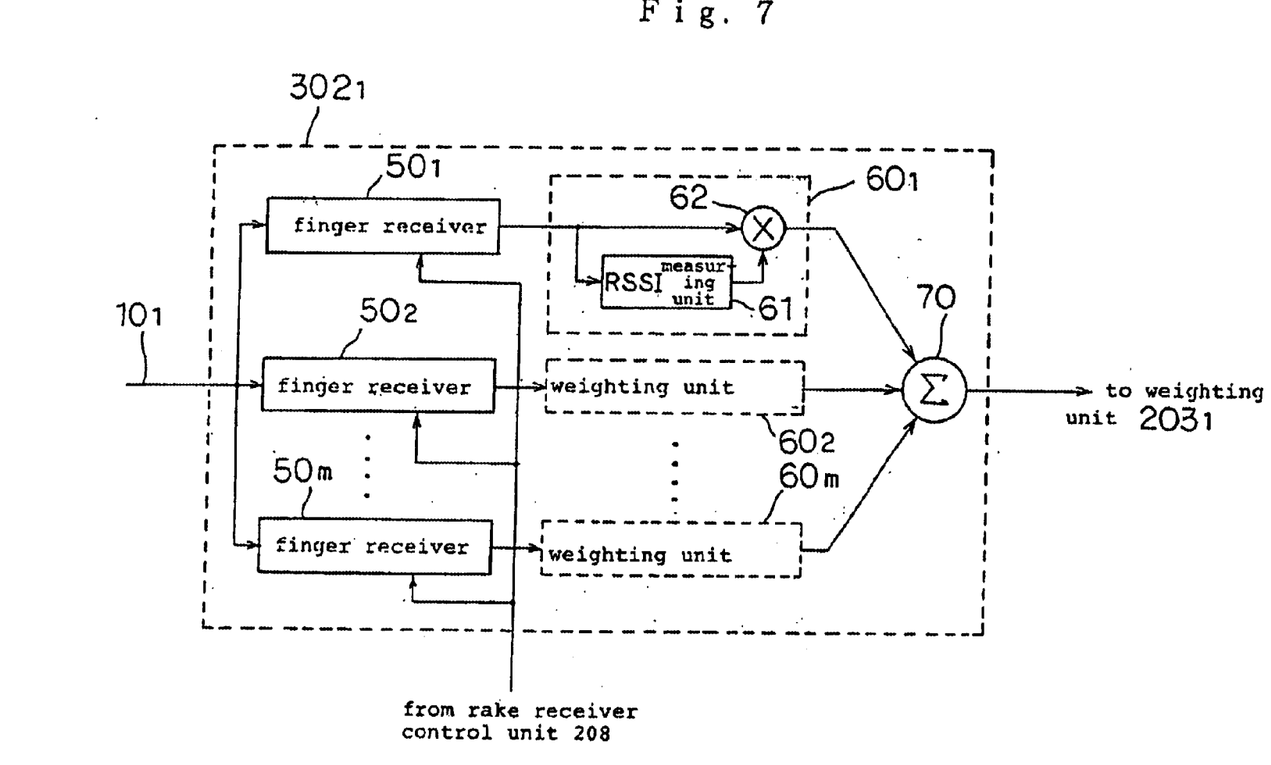
FIG. 7 is a block diagram showing the configuration of rake receiver $302_1$ in FIG. 5.

As shown in FIG. 7, rake receiver $302_1$ differs from rake receiver $202_1$ shown in FIG. 3 in that rake receiver $302_1$ includes weighting units $60_1$ to $60_m$ between finger receivers $50_1$ to $50_m$ and adder 70, respectively. Since the configurations of rake receivers $302_2$ to $302_n$ are similar to that of rake receiver $302_1$, the description thereof is omitted.

Each of weighting units $60_1$ to $60_m$ includes RSSI measuring unit 61 and multiplier 62. Weighting units $60_1$ to $60_m$ have functions and operations similar to those of weighting units $203_1$ to $203_n$ shown in FIG. 4, and the only difference between them is the position at which they are provided.

The CDMA communication device of the embodiment has the effect of estimating each transmission path in addition to the effects in the aforementioned first embodiment since weighting units $60_1$ to $60_m$ are provided for respective finger receivers $50_1$ to $50_m$.

While the aforementioned first and second embodiments have been described with the examples in which the present invention is applied to a mobile station, the present invention is not limited thereto and is similarly applicable to a base station of the CDMA cellular system, for example.

In addition, the aforementioned first and second embodiments perform the Eb/N0 measurement using the demodulated data after the combination to allow the Eb/N0 measurement with high accuracy even under a deteriorated reception environment, and the transmission power control is performed based on the measured Eb/N0. However., the present invention is not limited to the transmission power control and is similarly applicable to another control performed on the basis of the Eb/N0. With the aforementioned configuration, the control based on the Eb/N0 can be stably performed similarly to the transmission power control.

While preferred embodiments of the present have been described using specific terms, such description is for illustrative purposes only, and it is to be understood that changes and variations may be made without departing from the spirit or scope of the following claims.

What is claimed is:

1. A CDMA communication device comprising:
   means for weighting output signals from a plurality of rake receivers respectively; and
   means for combining the weighted output signals into one signal; and
   means for measuring an Eb/N0 of said one signal.

2. The CDMA communication device according to claim 1, further comprising means for controlling transmission power based on said measured Eb/N0.

3. The CDMA communication device according to claim 1, wherein said means for weighting performs weighting based on an RSSI of an output from each of said rake receivers.

4. The CDMA communication device according to claim 3, further comprising means for controlling transmission power based on said measured Eb/N0.

5. A CDMA communication device comprising:
   a plurality of rake receivers, each of said receivers for demodulating a received signal for each path and combining the respective demodulated data after the respective data are delayed based on a delay time;
   a plurality of first weighting means, each of said first weighting means for weighting the demodulated data after the combination output from each of said plurality of rake receivers;
   a first combining means for combining the signals weighted by said plurality of first weighting means; and
   an Eb/N0 measuring means for measuring an Eb/N0 of the demodulated data combined by said first combining means.

6. The CDMA communication device according to claim 5, wherein each of said first weighting means includes a first RSSI measuring means for measuring an RSSI of the demodulated data from each of said rake receivers, and weights the demodulated data from said take receiver based on the RSSI measured by said first RSSI measuring means.

7. The CDMA communication device according to claim 5, wherein each of said first weighting means includes a first RSSI measuring means for measuring an RSSI of the demodulated data from each of said rake receivers, and a first multiplier for multiplying the RSSI measured by said first RSSI measuring means by the demodulated data from said rake receiver.

8. The CDMA communication device according to claim 5, wherein each of said receivers includes:
   a plurality of finger receivers for individually demodulating a received signal for each path 5 to generate the demodulated data, and for delaying the demodulated data with delay time information contained in said received signal to output the demodulated data;
   a plurality of second weighting means for weighting the demodulated data output from said finger receivers, respectively; and
   a second combining means for combining the demodulated data from said second weighting means and outputting the combined data.

9. The CDMA communication device according to claim 8, wherein each of said second weighting means includes a second RSSI measuring means for measuring an RSSI of the demodulated data from each of said finger receivers, and weights the demodulated data from said finger receiver based on the RSSI measured by said second RSSI measuring means.

10. The CDMA communication device according to claim 8, wherein each of said second weighting means, and a second RSSI measuring means for measuring an RSSI of the demodulated data from each of said finger receivers, and includes a second multiplier for multiplying the RSSI measured by said second RSSI measuring means by the demodulated data from said finger receiver.

11. The CDMA communication device according to claim 5, further comprising means for controlling transmission power based on the Eb/N0 measured by said Eb/N0 measuring means.

12. The CDMA communication device according to claim 5, further comprising a transmission power control information generator for generating transmission power control information which is information for controlling transmission power based on the Eb/N0 measured by said Eb/N0 measuring means.

13. A CDMA communication device for decoding a plurality of received signals received at different antennas, comprising:
   a plurality of rake receivers, each of said receivers for detecting each of said received signals for each path, delaying demodulated data which are the detection result based on a set delay time, and then combining and outputting the demodulated data;
   a multipath searcher for acquiring reception 10 delay information which is information on a delay time among respective paths contained in said received signals;
   a rake receiver control means for setting the delay time for said rake receivers respectively based on the reception delay information acquired by said multipath searcher;
   a plurality of first weighting means, each of said first weighting means for weighting the demodulated data output from each of said rake receivers;
   a first combining means for combining the signals weighted by said first weighting means into one signal; and
   an Eb/N0 measuring means for measuring an Eb/N0 of the demodulated data combined by said first combining means.

14. The CDMA communication device according to claim 13, wherein each of said first weighting means includes a first RSSI measuring means for measuring an RSSI of the demodulated data from each of said rake receivers, and weights the demodulated data from said rake receiver based on the RSSI measured by said first RSSI measuring means.

15. The CDMA communication device according to claim 13, wherein each of said first weighting means includes a first RSSI measuring means for measuring an RSSI of the demodulated data from each of said rake receivers, and a first multiplier for multiplying the RSSI measured by said first RSSI measuring means by the demodulated data from said rake receiver.

16. A method for controlling transmission power for producing transmission power control information for controlling transmission power with a plurality of signals received at different antennas, said method comprising the steps of:
   detecting each of said received signals for each path at a respective rake receiver, delaying demodulated data which are the detection result for each path based on a set delay time, and then combining the demodulated data to produce combined demodulated data;
   acquiring reception delay information which is information on a delay time among respective paths contained in said received signals;
   setting said delay time based on said acquired reception delay information;
   weighing said combined demodulated data from each rake receiver respectively and then combining the combined demodulated data from each respective rake receiver into one demodulated data; and
   measuring Eb/N0 of the one demodulated data after the combination and producing said transmission power control information based on said measured Eb/N0.

17. The method of controlling transmission power according to claim 16, wherein said step of weighting said demodulated data includes measuring an RSSI of each of said demodulated data and multiplying said measured RSSI by said demodulated data.

18. A method for controlling transmission power for producing transmission power control information for controlling transmission power with a plurality of signals received at different antennas, said method comprising the steps of:
   detecting each of said received signals for each path at a respective rake receiver, delaying demodulated data which are the detection result for each path based on a set delay time, weighing the demodulated data for each path, and then combining the demodulated data to produce combined demodulated data;
   acquiring reception delay information which is information on a delay time among respective paths contained in said received signals;
   setting said delay time based on said acquired reception delay information;
   weighing said combined demodulated data from each rake receiver respectively and then combining the combined demodulated data from each respective rake receiver into one demodulated data; and
   measuring Eb/N0 of the one demodulated data after the combination and producing said transmission power control information based on said measured Eb/N0.

19. The method of controlling transmission power according to claim 18, wherein said step of weighting said demodulated data includes measuring an RSSI of each of said demodulated data and multiplying said measured RSSI by said demodulated data.

* * * * *